United States Patent
Amaya Gonzalez et al.

(10) Patent No.: US 12,495,337 B2
(45) Date of Patent: Dec. 9, 2025

(54) HANDOVER ON THE FLY THROUGH AUTOMATIC NEIGHBOR RELATIONS (ANR) NEIGHBOR DISCOVERY PROCESS

(71) Applicant: DISH Wireless L.L.C., Englewood, CO (US)

(72) Inventors: Norberto Amaya Gonzalez, Littleton, CO (US); David Ricardo Bentolila Sapiani, Littleton, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 416 days.

(21) Appl. No.: 18/097,714

(22) Filed: Jan. 17, 2023

(65) Prior Publication Data

US 2024/0147316 A1   May 2, 2024

Related U.S. Application Data

(60) Provisional application No. 63/419,616, filed on Oct. 26, 2022.

(51) Int. Cl.
*H04W 36/00* (2009.01)

(52) U.S. Cl.
CPC . *H04W 36/0061* (2013.01); *H04W 36/00835* (2018.08)

(58) Field of Classification Search
CPC ....... H04W 36/0061; H04W 36/00835; H04W 24/02; H04W 36/08; H04W 36/008375; H04W 36/0083
See application file for complete search history.

(56) References Cited

U.S. PATENT DOCUMENTS

| | | | |
|---|---|---|---|
| 2010/0124179 A1* | 5/2010 | Lee | H04W 48/08 370/252 |
| 2013/0143572 A1* | 6/2013 | Kang | H04W 36/08 455/437 |

(Continued)

FOREIGN PATENT DOCUMENTS

CN    104782175 A    7/2015

OTHER PUBLICATIONS

International Search Report and Written Opinion for International Application No. PCT/US2023/077537, dated Feb. 16, 2024, 17 pages.

*Primary Examiner* — Kan Yuen
(74) *Attorney, Agent, or Firm* — Seed Intellectual Property Law Group LLP

(57) ABSTRACT

Systems and methods are described herein for automatically detecting wireless neighbor relationships within a wireless network. While a user device is using a first cell for communications, the user device detects and provides a physical cell identifier for a second cell to a computing device, e.g., the first cell or server. The computing device queries a relationship table of the first cell for a known handover relationship between the first cell and the second cell. If the table does not include the known handover relationship, the computing device instructs the user device to obtain a cell global identifier of the second cell. The computing device then adds a new handover relationship between the first cell and the second cell to the relationship table using the cell global identifier of the second cell. Communications for the user device can be automatically handed over from the first cell to the second cell.

17 Claims, 4 Drawing Sheets

(56) References Cited

U.S. PATENT DOCUMENTS

| | | | |
|---|---|---|---|
| 2014/0228031 A1 | 8/2014 | Masini et al. | |
| 2014/0242982 A1* | 8/2014 | Yang | H04W 36/0085 |
| | | | 455/434 |
| 2015/0119043 A1* | 4/2015 | Gopal | H04W 36/00835 |
| | | | 455/437 |
| 2016/0029253 A1 | 1/2016 | Sarkar et al. | |
| 2016/0353330 A1* | 12/2016 | Naik | H04L 65/1016 |
| 2019/0281514 A1* | 9/2019 | Krishnan | H04W 24/02 |
| 2024/0147316 A1* | 5/2024 | Amaya Gonzalez | |
| | | | H04W 36/0083 |
| 2024/0267800 A1* | 8/2024 | Pan | G06N 3/048 |

* cited by examiner

HANDOVER ON THE FLY THROUGH AUTOMATIC NEIGHBOR RELATIONS (ANR) NEIGHBOR DISCOVERY PROCESS

BACKGROUND

Smart phones are being used more and more by more and more people. As the use of smart phones has increased, so too has the desire for more reliable, fast, and continuous transmission of content. In an effort to improve content transmission, networks continue to improve with faster speeds and increased bandwidth. The increase in the number of smart phones, however, has also resulted in increased cellular traffic. To account for increased traffic, many networks continuously add additional cell towers. But as people move around, cell towers need to handover service of smart phones to other cell towers, such as when a smart phone is too far from a current cell or when the current cell is experiencing too much traffic. The ability to accurately handover service may be impacted as new cell towers are added to a network. It is with respect to these and other considerations that the embodiments described herein have been made.

BRIEF SUMMARY

Embodiments are generally directed to systems and methods for automatically detecting wireless neighbor relationships within a wireless network. User devices of a wireless network communicate with other user devices or with other computing devices via a cell tower in the network. Those communications can be handed over from one cell to another cell for a variety of reasons. But the identity and general location of those cells is known prior to the handover occurring. In some instances, though, a cell's identity or location may not be known when a handover is to be performed.

While a user device is using a first cell for communications, the user device detects a physical cell identifier for a second cell. The user device provides the physical cell identifier, and sometimes a signal strength associated with the second cell, to the first cell. The first cell, or another computing device, may then query a relationship table of the first cell for a known handover relationship between the first cell and the second cell. If the relationship table does not include the known handover relationship, the first cell instructs the user device to obtain a cell global identifier of the second cell. In response to the first cell receiving the cell global identifier of the second cell from the user device, the first cell, or the other computing device, adds a new handover relationship between the first cell and the second cell to the relationship table using the cell global identifier of the second cell. Communications for the user device can then be automatically handed over from the first cell to the second cell.

Embodiments described herein improve the efficiency of cell towers or user devices, or cellular or wireless networks in general. By having the user device and the first cell work together to identify the second cell, handovers can be automatically performed from the first cell to the second cell without having to use a third cell or without having to wait for an administrator to add the new handover relationship to the relationship table or without having to wait for an administrator to verify the new handover relationship. As a result, the wireless network performs more efficiently.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
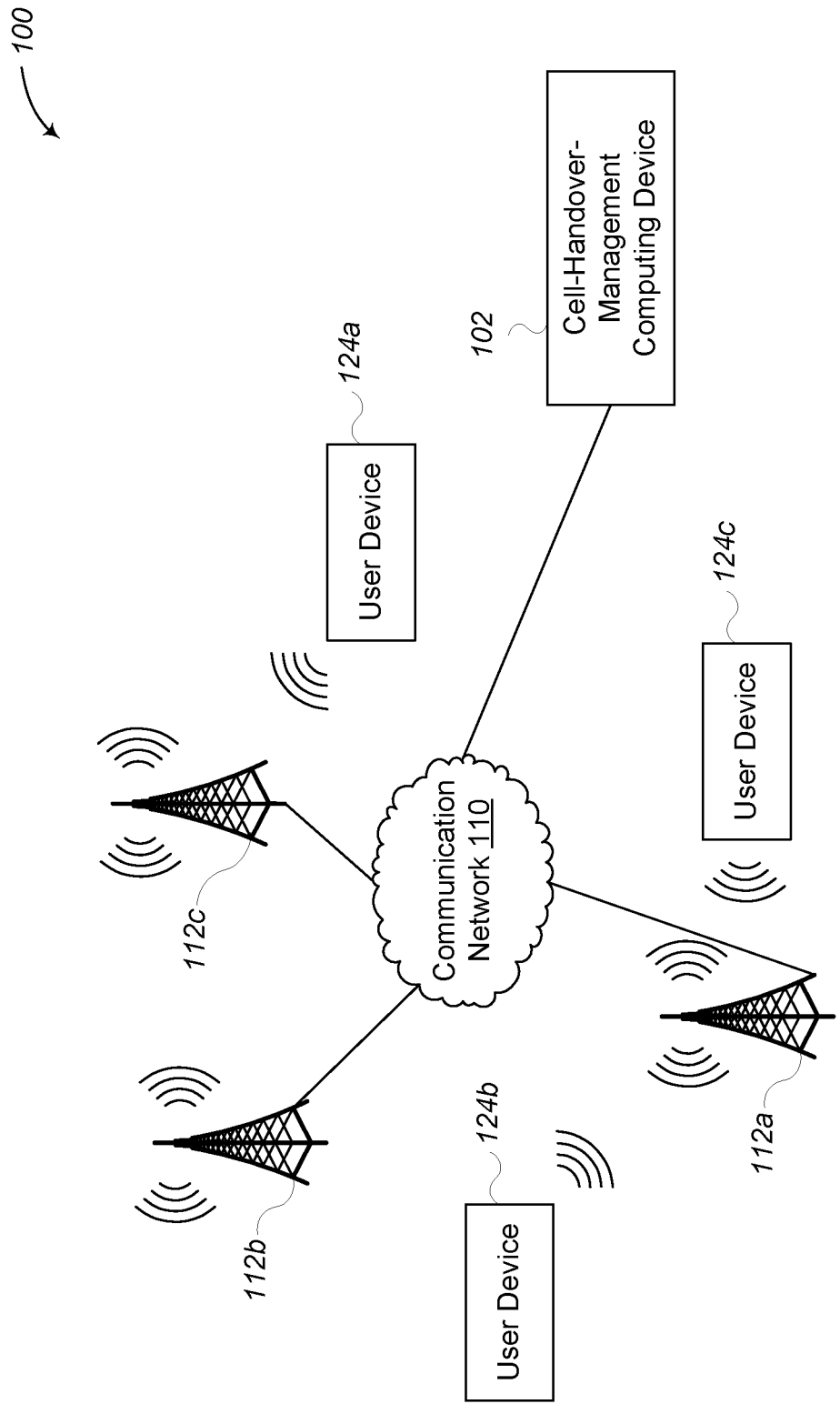
FIG. 1 illustrates a context diagram of an environment for automatically detecting neighbor cells in which to handover service in a wireless network in accordance with embodiments described herein.

FIG. 1 illustrates a context diagram of an environment 100 for automatically detecting neighbor cells in which to handover service in a wireless network in accordance with embodiments described herein. Environment 100 includes a plurality of cells 112a-112c, a plurality of user devices 124a-124c, and a communication network 110. Communication network 110 includes one or more wired or wireless networks, which may include a series of smaller or private connected networks that carry information between the cells 112a-112c, and between the cells 112a-112c and the cell-handover-management computing device 102, and between the cells 112a-112c and other computing devices (not shown).

The user devices 124a-124c (collectively or individually referred to as user devices 124 or user device 124) are computing devices that receive and transmit cellular communication messages with cells 112a-112c. Examples of user devices 124a-124c may include, but are not limited to, mobile devices, smartphones, tablets, cellular-enabled laptop computers, or other computing devices that can communication with a cellular network. In some embodiments, the user devices 124a-124c may also be referred to as user equipment or UEs.

The cells 112a-112c (collectively or individually referred to as cells 112 or cell 112) may be various combinations of cellular network cells, cellular network towers, cellular network base stations, or other cellular network hardware or infrastructure that together provide the hardware infrastructure of a cellular communications network, e.g., a 5G cellular communications network. Cells 112a-112c include or may also be referred to as towers or cell towers. The cell 112a-112c may include or be in communication with base stations, radio back haul equipment, antennas, or other devices, which are not illustrated for ease of discussion. Each cell 112 provides compatible cellular communications over a coverage area. The coverage area, bandwidth, and overall communication quality depends on multiple factors regarding the cell, including, but not limited to, height of the antenna of the cell above the ground, radio parameters, weather conditions, etc. Although FIG. 1 shows three cells 112a-112c, embodiments are not so limited and other numbers of cells may be utilized.

User devices 124a-124c communicate with a specifically selected or assigned cell 112 to transmit data to or to facilitate communication with other user devices 124a-124c or other computing devices (not illustrated). A cell 112 is selected for a particular user device 124 based on one or more different networking criteria, such as current load on the cells 112a-112c, proximity between the user device 124 and a cell 112, current interference, type of data being transmitted by the user device 124, coverage provided by a cell 112, signal strength between a cell 112 and a user device 124, etc. Although FIG. 1 shows three user devices 124a-124c, embodiments are not so limited and other numbers of user devices may be utilized.

In this illustrative example, assume user device 124b is utilizing cell 112a for communicating with another computing device. During the communication, the user device 124b may be scanning or obtaining the physical cell identifiers of other cells in proximity to the user device 124b. For example, user device 124b may obtain the physical cell identifier for cell 112b. The user device 124b can then provide a report to cell 112a with the physical cell identifier of cell 112b. This report may also include the signal strength associated with the signal containing the physical cell identifier. The cell 112a then determines if there is a known handover relationship between cell 112a and 112b. If there is no handover relationship, then cell 112a instructs user device 124b to obtain the cell global identifier of cell 112b. The user device 124b can then provide the obtained cell global identifier to cell 112a. Cell 112a then generates a handover relationship between cell 112a and 112b. If the user device 124b requested handover to cell 112b or if cell 112a determines that it is to handover the communication to cell 112b, then cell 112a automatically initiates the handover from cell 112a to cell 112b.

In various embodiments, environment 100 may also include a cell-handover-management computing device 102. The cell-handover-management computing device 102 may employ embodiments similar to cell 112a described above with respect to determining if there is a handover relationship between cells, instructing the user device to obtain the cell global identifier, and updating the handover relationship table of the first. In some embodiments, the cell-handover-management computing device 102 may further facilitate the handover of communications from the first cell to the second cell, including informing the first and second cells of the handover.

The operation of certain aspects will now be described with respect to FIGS. 2 and 3. Process 200 described in conjunction with FIG. 2 may be implemented by one or more processors or executed via circuitry on one or more computing devices, such as a user device 124 in FIG. 1. Process 300 described in conjunction with FIG. 3 may be implemented by one or more processors or executed via circuitry on one or more computing devices, such as cells 112a-112c in FIG. 1. In some embodiments, process 300 may be implemented by the cell-handover-management computing device 102 in FIG. 1.

Figure 2:
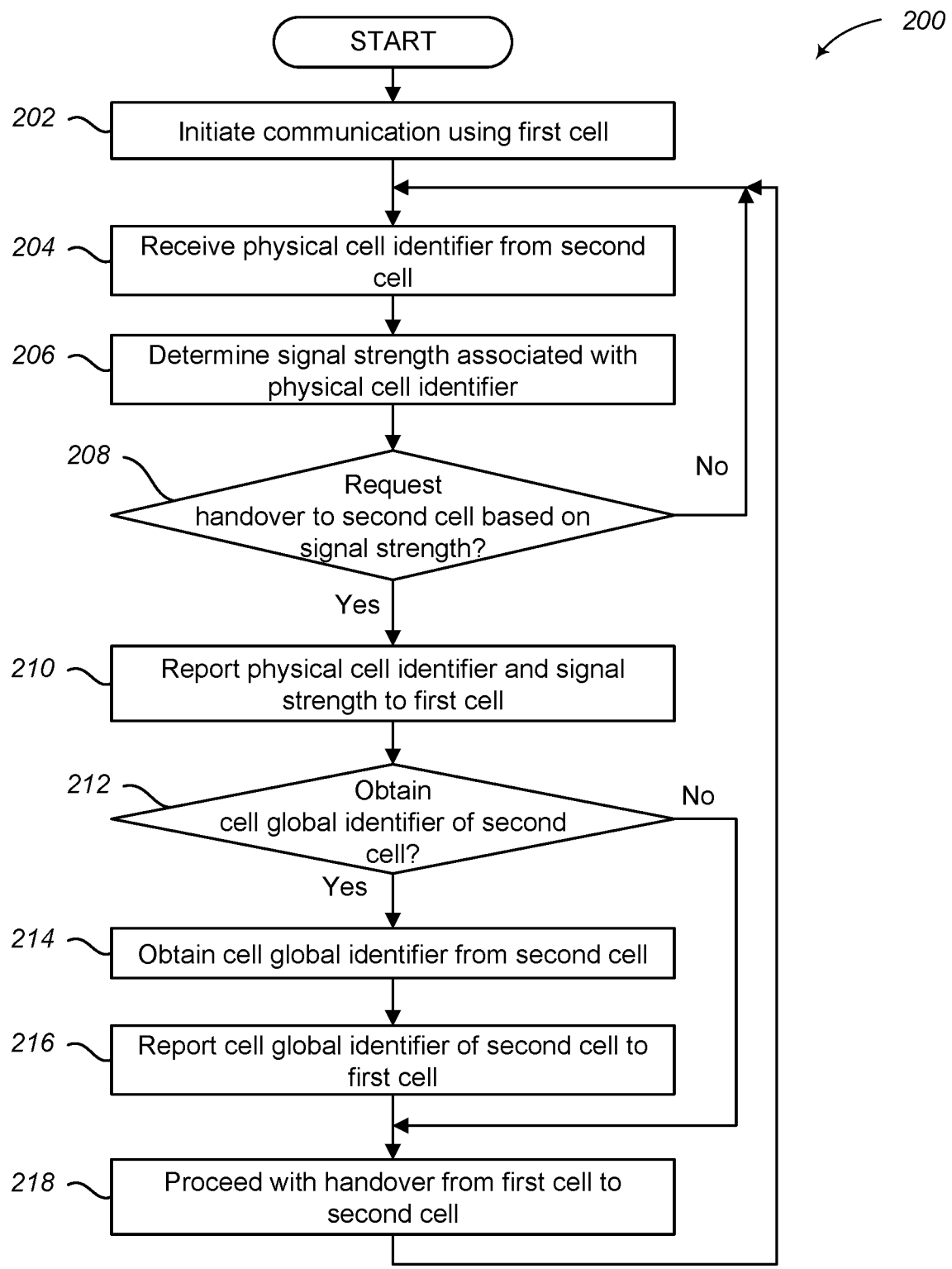
FIG. 2 illustrates a logical flow diagram showing one embodiment of a process by a user device for identifying a target cell for service handover in accordance with embodiments described herein.

FIG. 2 illustrates a logical flow diagram showing one embodiment of a process 200 by a user device for identifying a target cell, also referred to in FIG. 2 as the second cell, for service handover in accordance with embodiments described herein.

Process 200 begins, after a start block, at block 202, where communication is initiated for the user device using a first cell in a network. In various embodiments, the first cell is the cell that is currently assigned to handle communications for the user device. In general, the first cell is the cell that is in direct wireless communication with the user device and is facilitating the transfer of voice and data messages to and from the user device. In at least one embodiment, the first cell may be referred to as the current cell. In some embodiments, the communication may be a wireless call between the user device and another computing device, such as another user device. In other embodiments, the communication may be a transfer of data between the user device and another computing device.

Process 200 proceeds after block 202 to block 204, where the user device receives a physical cell identifier (PCI) from a second cell. The second cell is a cell in which the first cell may handover management of the user device communication. Each cell in the network may periodically broadcast its physical cell identifier. In this way, user devices that receive the physical cell identifier know that they are in range of and can send and receive wireless transmissions from that cell. In various embodiments, the user device "listens" for the physical cell identifier being broadcast by cells in the network, including the second cell. In various embodiments, the second cell may be a new cell that has recently been added to the network, or it may be a previously down cell that has now come back online, or it may just be another cell in the network. In some embodiments, second cell may be referred to as the possible handover cell or target cell for the handover.

Process 200 continues after block 204 at block 206, where the signal strength of the transmission carrying the physical cell identifier is determined. In various embodiments, the signal strength may be determined based on the received power of the signal.

Process 200 proceeds after block 206 to decision block 208, where a determination is made whether the user device is to request handover of its communication from the first cell to the second cell. In some embodiments, the user device may determine to request a handover in response to the signal quality, or the signal strength, or a combination of signal quality and signal strength, with the first or current cell being degraded, such as when the user device is moving away from the first cell, interference exceeds a threshold value, latency exceeds a threshold value, etc. If the user device is to request handover to the second cell, process 200 flows to block 210; otherwise, process 200 loops to block 204 to continue the communication via the first cell and receive physical cell identifiers (e.g., "listen") for other cells at block 204.

At block 210, the user device reports the physical cell identifier and the signal strength of the second cell to the first cell. One example of this report may be {PCI 78 RSRP-70}. In this example, "PCI 78" indicates the physical cell identifier of the second cell and "RSRP-70" indicates the current reference signal received power (i.e., the signal strength) to the second cell.

Although process 200 describes the user device as providing this report of the physical cell identifier and the signal strength of the second cell to the first cell in response to a handover request, embodiments are not so limited. In some embodiments, decision block 208 may be optional and the user device may periodically, or when requested by the first cell, provide this report to the first cell. In this way, the first cell is using this report to determine which cells the user device can send and receive wireless transmissions and how strong the signals are for those transmissions. The first cell can then determine if the user device should be handed over to another cell, such as the second cell.

Process 200 continues after block 210 at decision block 212, where a determination is made whether the user device is to obtain the cell global identifier (CGI) of the second cell. In various embodiments, the first cell instructs the user device to obtain the cell global identifier of the second cell if the relationship table for the first cell has no entry identifying a known handover relationship between the first cell and the second cell, as described herein. For example, the first cell, at block 308 in FIG. 3, instructs the user device to obtain the cell global identifier of the second cell. If the relationship table for the first cell has an entry identifying a known handover relationship between the first cell and the second cell, then the first cell may proceed with the handover from the first cell to the second cell and not instruct the user device to obtain the cell global identifier of the second cell.

If user device is to obtain the cell global identifier of the second cell, then process 200 flows to block 214; otherwise, process 200 flows to block 218.

At block 214, the user device obtains or collects the cell global identifier of the second cell. In some embodiments, the user device sends a request directly to the second cell for its cell global identifier—in which the second cell responds with the cell global identifier. In other embodiments, the user device can obtain the cell global identifier from the same broadcast transmissions of the second cell's physical cell identifier.

Process 200 proceeds after block 214 to block 216, where the user device reports the cell global identifier of the second cell to the first cell.

Process 200 continues after block 214 at block 218, where the user device proceeds with the handover from the first cell to the second cell. In some embodiments, the first cell notifies the user device that it is being handed over to the second cell.

After block 218, process 200 loops to decision block 204 to determine if the user device is to query for another cell handover. In some embodiments, the user device may periodically query or listen for other cells in which it can send or receive wireless transmissions. In other embodiments, the user device may query for handover cells in response to other network or signal factors.

Figure 3:
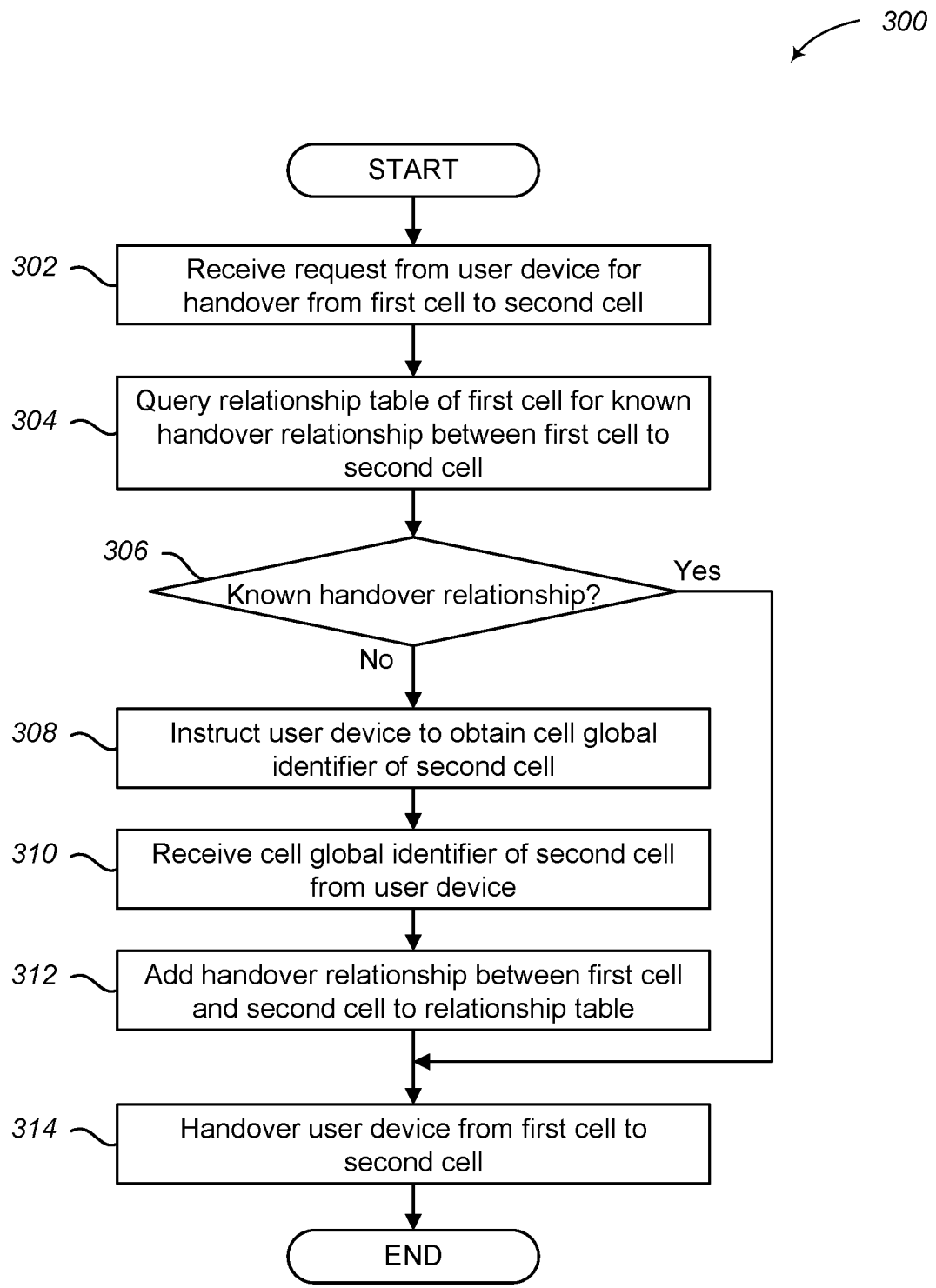
FIG. 3 illustrates a logical flow diagram showing one embodiment of a process by a cell for automatically adding a target cell as a neighbor cell for handover in accordance with embodiments described herein.

FIG. 3 illustrates a logical flow diagram showing one embodiment of a process 300 by a cell for automatically adding a target cell, also referred to in FIG. 2 as the second cell, as a neighbor cell for handover in accordance with embodiments described herein.

Process 300 begins, after a start block, at block 302, where a first cell received request from a user device for a handover from the first cell to a second cell. In various embodiments, the user device reports, at block 210 in FIG. 2, the physical cell identifier and the signal strength of the second cell to the first cell. In some embodiments, this report may be in response to or accompany a handover request. In at least one embodiment, this report may be received without a handover request, and the first cell may determine whether a handover is warranted.

Process 300 proceeds after block 302 at block 304, where a relationship table of the first cell is queried for a known handover relationship between the first cell and the second cell. In various embodiments, the first cell maintains a table, list, database, or other data structure that lists all known handover relationships of the first cell. In some embodiments, the relationship table is maintained by the cell-handover-management computing device 102 in FIG. 1, which is separate from the first cell. In this way, the cell-handover-management computing device 102 can maintain relationship tables for a plurality of cells in the network or in a geographical area.

A handover relationship is a mapping or identification of two cells as having overlapping coverage such that one cell in the relationship can handover communications to the other cell of the relationship. A handover relationship is known if one cell knows or is informed that it can handover communications to another cell. In some embodiments, the handover relationship may include a geographical location one or both cells of the relationship. In other embodiments, the handover relationship may include a general direction of one cell from the other cell.

The relationship table of first cell may not have a known handover relationship between the first cell and the second cell if the first cell is new, or the first cell has not previously been notified of the second cell, or if the first cell dropped a previous handover relationship with the second cell in response to the second cell being down for a threshold amount of time.

In some embodiments, the relationship table may not be queried if the signal strength associated with the signal containing the physical cell identifier is below a threshold value, as this low signal strength may indicate that the user device is too far from the second cell to properly utilize the second cell for communications.

Process 300 continues after block 304 at decision block 306, where a determination is made whether the relationship table includes a known handover relationship between the first cell and the second cell. If there is a known handover relationship, then process 300 flows to block 314 to proceed with the handover of the user device from the first cell to the second cell; otherwise, process 300 flows to block 308.

At block 308, the first cell instructs the user device to obtain the cell global identifier of the second cell.

Process 300 proceeds after block 308 to block 310, where the first cell receives the cell global identifier of the second cell from the user device. In various embodiments, the user device reports, at block 216 in FIG. 2, the cell global identifier of the second cell to the first cell.

Process 300 continues after block 310 at block 312, where a handover relationship between the first cell and the second cell is added to the relationship table. In various embodiments, the handover relationship is added to the relationship table if the signal strength exceeds a threshold value. If the signal strength is too low (e.g., does not exceed the threshold value), then that may indicate insufficient coverage overlap between the first cell and the second cell, which can result in an incomplete or poor handover from the first cell to the second cell. As a result, if the signal strength is too low, the handover relationship is not added to the relationship table in some embodiments.

Process 300 proceeds after block 312 to block 314, where the handover of the user device from the first cell to the second cell is initiated. In some embodiments, the second cell and the user device are notified of the second cell and that the second cell is to manage communications with the user device. The first or current cell communicating with the user device may be instructed to halt the management of communications with the user device.

After block 314, process 300 may terminate or otherwise return to a calling process.

Although process 300 is primarily described as being performed by the first cell, embodiments are not so limited. Rather, in some embodiments, the cell-handover-management computing device 102 in FIG. 1 may perform process 300. In this way, the cell-handover-management computing device 102 may receive the handover request from the first cell at block 302, query a relationship table of the first cell for the known handover relationship at block 304, determine if there is a known handover relationship at decision block 306, instruct the first cell at block 308 to then instruct the user device to obtain the cell global identifier of the second cell, receive the cell global identifier of the second cell from the first cell at block 310, add a handover relationship between the first cell and the second cell to the relationship table of the first cell (and optionally the relationship table of the second cell) at block 312, and then initiate the handover of the user device from the first cell to the second cell at block 314.

Moreover, although processes 200 and 300 in FIGS. 2 and 3, respectively, describe the handover of the user device from the first cell to the second cell, embodiments are not so limited. In some embodiments, the first cell may handover the user device to another third cell, but the first cell may use the user device to identify the second cell as having a handover relationship with the first cell, as is described.

Figure 4:
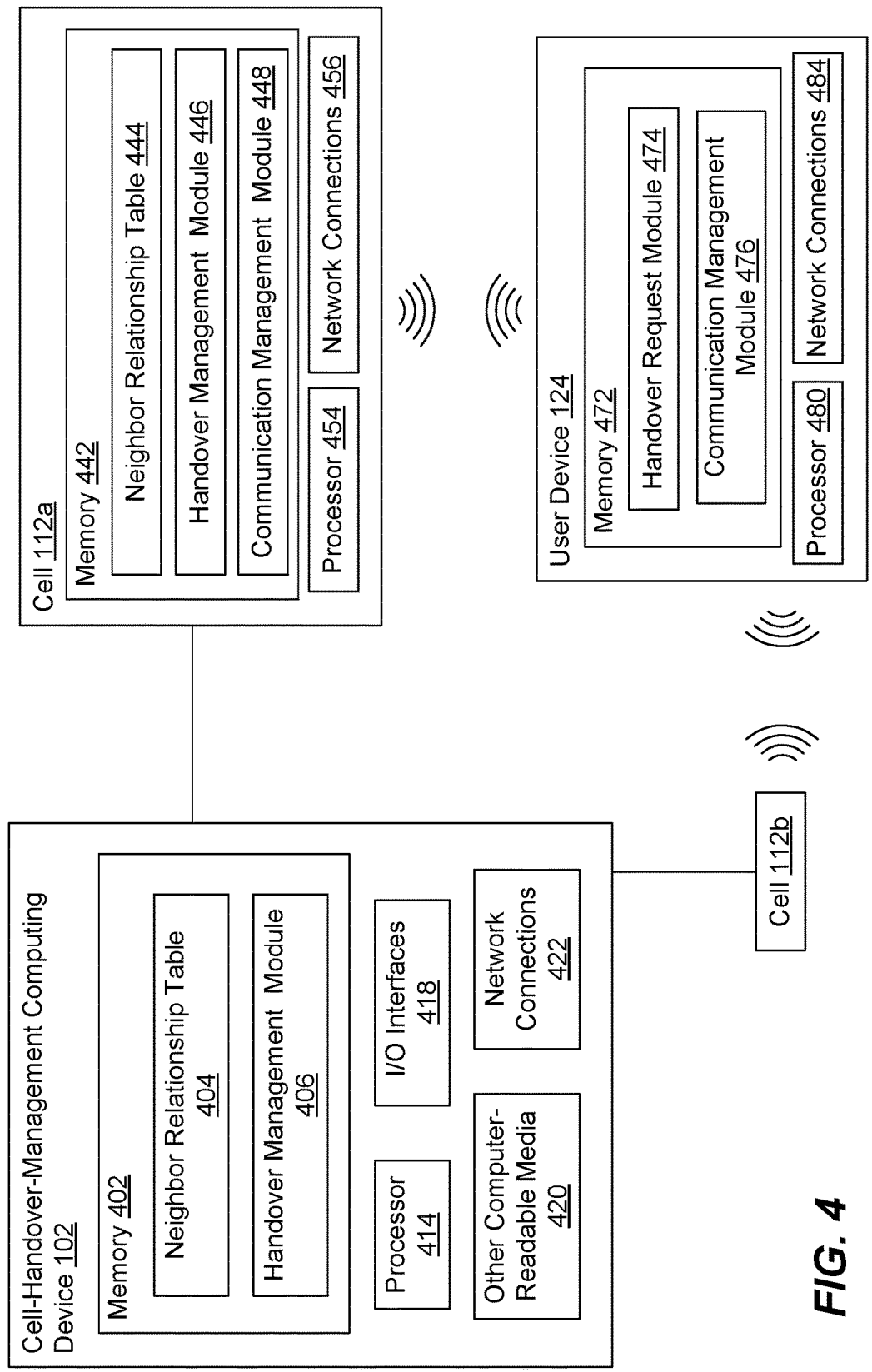
FIG. 4 shows a system diagram that describes various implementations of computing systems for implementing embodiments described herein.

FIG. 4 shows a system diagram that describes various implementations of computing systems for implementing embodiments described herein. System 400 includes a cell-handover-management computing device 102, cells 112a-112b, and a user device 124. In this example, assume cell 112a is the first or current cell that is managing communications for the user device 124, and assume cell 112b is the second or possible handover cell.

Similar to FIG. 1, system 400 may include more cells and more user devices than what is shown, but only two cells and one user device are shown in FIG. 4 for ease of discussion. In some embodiments, the cell-handover-management computing device 102 may be optional and may not be included.

The cell-handover-management computing device 102 maintains neighbor relationship tables for a plurality of cells and automatically updates those tables based on the physical cell identifier, the signal strength, and the cell global identifier of a target cell that is obtained by the user device 124, as described herein. One or more special-purpose computing systems may be used to implement the cell-handover-management computing device 102. Accordingly, various embodiments described herein may be implemented in software, hardware, firmware, or in some combination thereof. The cell-handover-management computing device 102 may include memory 402, one or more processors 414 (e.g., central processing unit, microcontroller, virtual processing resources, etc.), I/O interfaces 418, other computer-readable media 420, and network connections 422.

Memory 402 may include one or more various types of non-volatile and/or volatile storage technologies. Examples of memory 402 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 402 may be utilized to store information, including computer-readable instructions that are utilized by processor 414 to perform actions, including embodiments described herein.

Memory 402 may have stored thereon neighbor relationship table 404 and handover management module 406. Although the handover management module 406 is illustrated as a single module, embodiments are not so limited. Rather, one module or a plurality of modules may be employed to perform the functionality of the handover management module 406. Moreover, the functionality of these modules may also be performed using circuitry or other computer hardware components or software.

The neighbor relationship table 404 maintains or stores one or more neighbor relationship tables for one or a plurality of cells 112. Each neighbor relationship table identifies or lists neighboring cells that can perform a handover from one cell to the other cell, as described herein.

The handover management module 406 is configured to query the neighbor relationship table 404 for a known neighbor relationship between cell 112a and cell 112b in response to the user device 124 obtaining a physical cell identifier of cell 112b. The handover management module 406 can then instruct cell 112a to instruct the user device 124 to obtain the cell global identifier of cell 112b if there is no known relationship. The handover management module 406 can update the neighbor relationship table 404 based on the cell global identifier of cell 112b to identify a handover relationship between cell 112a and cell 112b. In various embodiments, the handover management module 406 may also automatically initiate the handover from cell 112a to cell 112b. In some embodiments, the handover management module 406 may store computer instructions that, when executed by the processor 414, perform embodiments described herein, such as process 300 in FIG. 3.

Memory 402 may also store other programs and data (not illustrated), which may include additional information about cells 112a-112b and user device 124, or other information.

Network connections 422 are configured to communicate with other computing devices, such as cells 112a-112b or other cells not illustrated. In various embodiments, the network connections 422 include transmitters and receivers (not illustrated) to send and receive data and information to the cells 112a-112b, as described herein. I/O interfaces 418 may include video interfaces, audio interfaces, other data input or output interfaces, or the like. The I/O interfaces 418 may be configured to enable an administrator to view, generate, or modify the neighbor relationship table 404. Other computer-readable media 420 may include other types of stationary or removable computer-readable media, such as removable flash drives, external hard drives, or the like.

Cell 112a manages communications between the user device 124 and other computing devices (not illustrated). In various embodiments, cell 112a maintains a neighbor relationship table for cells in which it can perform a handover and automatically updates that table based on the physical cell identifier, the signal strength, and the cell global identifier of a target cell that is obtained by the user device 124, as described herein. One or more special-purpose computing systems may be used to implement the cell 112a. Accordingly, various embodiments described herein may be implemented in software, hardware, firmware, or in some combination thereof. The cell 112a may include memory 442, one or more processors 454 (e.g., central processing unit, microcontroller, virtual processing resources, etc.), and network connections 456. Although not illustrated, cell 112a may also include I/O interfaces, other computer-readable media, or other computing components.

Memory 442 may include one or more various types of non-volatile and/or volatile storage technologies. In various embodiments, memory 442 may be similar or include similar examples as memory 402. Memory 442 may be utilized to store information, including computer-readable instructions that are utilized by processor 454 to perform actions, including embodiments described herein.

Memory 452 may have stored thereon neighbor relationship table 444, handover management module 446, and communication management module 448. The communication management module 448 may be configured to manage communication for the user device 124, as described herein.

In various embodiments, neighbor relationship table 444 may be similar to and employ embodiments similar to neighbor relationship table 404. Similarly, handover management module 446 may be similar to and employ embodiments similar to handover management module 406 to perform embodiments described herein. For example, the handover management module 446 is configured to query the neighbor relationship table 444 for a known neighbor relationship between cell 112a and cell 112b in response to the user device 124 obtaining a physical cell identifier of cell 112b. In some embodiments, the handover management module 446 may query the neighbor relationship table 404 maintained by the cell-handover-management computing device 102. The handover management module 446 can then instruct the user device 124 to obtain the cell global identifier of cell 112b if there is no known relationship. The handover management module 446 can update the neighbor relationship table 444 based on the cell global identifier of cell 112b to identify a handover relationship between cell 112a and cell 112b. In various embodiments, the handover management module 446 may also automatically initiate the handover from cell 112a to cell 112b.

Memory 442 may also store other programs and data (not illustrated), which may include additional information about cells 112a-112b and user device 124, or other information.

Network connections 456 are configured to communicate with other computing devices, such as user device 124, cell-handover-management computing device 102, or other cells. In various embodiments, the network connections 456 include transmitters and receivers (not illustrated) to send and receive data and information to the user device 124, as described herein.

In various embodiments, cell 112b is similar to and employs embodiments of cell 112a.

User device 124 communicates with other computing devices (not illustrated) via cells 112a-112b. In various embodiments, user device 124 obtains the physical cell identifier, the signal strength, and the cell global identifier of a target cell and provides that information to a current cell so that a handover relationship can be automatically generated, as described herein. One or more special-purpose computing systems may be used to implement the user device 124. Accordingly, various embodiments described herein may be implemented in software, hardware, firmware, or in some combination thereof. The user device may include memory 472, one or more processors 480 (e.g., central processing unit, microcontroller, virtual processing resources, etc.), and network connections 484. Although not illustrated, user device 124 may also include I/O interfaces, other computer-readable media, or other computing components.

Memory 472 may include one or more various types of non-volatile and/or volatile storage technologies. In various embodiments, memory 472 may be similar or include similar examples as memory 402. Memory 472 may be utilized to store information, including computer-readable instructions that are utilized by processor 480 to perform actions, including embodiments described herein.

Memory 472 may have stored thereon handover request module 474 and communication management module 476. The communication management module 476 may be configured to send and receive wireless transmissions with cells 112a-112b to establish communications with other computing devices, as described herein.

The handover request module 474 is configured to obtain the physical cell identifier of cell 112b and provide it to cell 112a. In response to the cell 112a or the cell-handover-management computing device 102 determining that there is no known handover relationship between cell 112a and cell 112b, the handover request module 474 may obtain the cell global identifier of cell 112b. The handover request module 474 can then provide the cell global identifier to cell 112a for the generation of a handover relationship between cell 112a and cell 112b.

Memory 480 may also store other programs and data (not illustrated), which may include additional information about cells 112a-112b or other information.

Network connections 484 are configured to communicate with other computing devices, such as cells 112a-112b. In various embodiments, the network connections 484 include transmitters and receivers (not illustrated) to send and receive data and information from cells 112a-112b, as described herein.

The following is a summarization of the claims as filed.

A system may be summarized as comprising a computing device that includes a first memory that stores first computer instructions and a first processor. The first processor may be configured to execute the first computer instructions to: receive a request to handover wireless communications for a user device from a first cell in a network to a second cell in the network; and query a relationship table of the first cell for a known handover relationship between the first cell and the second cell. In response to a lack of the known handover relationship between the first cell and the second cell in the relationship table of the first cell, the first processor may be configured to execute the first computer instructions to:

instruct the user device to obtain a cell global identifier of the second cell; receive the cell global identifier of second cell from the user device; and add a new handover relationship between the first cell and the second cell to the relationship table using the cell global identifier of the second cell. The first processor may also be configured to execute the first computer instructions to handover the communications for the user device from the first cell to the second cell.

The request may include a physical cell identifier of the second cell. And the first processor may be configured to query the relationship table of the first cell by further executing the first computer instructions to compare the physical cell identifier to entries in the relationship table to determine whether the relationship table includes an entry for the known handover relationship between the first cell and the second cell.

The first processor may be configured to add the new handover relationship between the first cell and the second cell to the relationship table by further executing the first computer instructions to: generate an entry in the relationship table of the first cell, wherein the entry includes a mapping between a physical cell identifier of the second cell and the cell global identifier of the second cell.

The request includes a signal strength associated with second cell. And the first processor may be configured to query the relationship table of the first cell by further executing the first computer instructions to: determine whether the signal strength exceeds a threshold value; and in response to the signal strength exceeding the threshold value, query the relationship table for the known handover relationship.

The computing device may be the first cell.

The system may further include a user device that includes a second memory that stores second computer instructions and a second processor. The second processor may be configured to execute the second computer instructions to: initiate the communications with another computing device using the first cell; receive a physical cell identifier from the second cell; send the request to handover the communications from the first cell to the second cell, wherein the request includes the physical cell identifier; receive an instruction from the computing device to obtain the cell global identifier of the second cell; obtain the cell global identifier of the second cell from second cell; and report the cell global identifier of second cell to the computing device.

The system may further include a user device that includes a second memory that stores second computer instructions and a second processor. The second processor may be configured to execute the second computer instructions to: request handover of the communications from the first cell to the second cell in response to receipt of an indication of the second cell; obtain the cell global identifier of the second cell in response to receipt of an instruction from the computing device to obtain the cell global identifier of the second cell; and report the cell global identifier of second cell to the computing device.

The system may further include a user device that includes a second memory that stores second computer instructions and a second processor. The second processor may be configured to execute the second computer instructions to: receive a physical cell identifier and a signal strength associated with the second cell; report the physical cell identifier and the signal strength to the computing device to request the handover from the first cell to the second cell; obtain the cell global identifier of the second cell in response to receipt of an instruction from the computing device to obtain the cell global identifier of the second cell; and report the cell global identifier of second cell to the computing device to complete the handover from the first cell to the second cell.

A method may be summarized as including: receiving, at a computing device, a request to handover wireless communications for a user device from a first cell in a network to a second cell in the network; determining, by the computing device, if a known handover relationship between the first cell and the second cell is stored in a relationship table of the first cell; in response to determining that the known handover relationship between the first cell and the second cell is not stored in the relationship table of the first cell: instructing, by the computing device, the user device to obtain a cell global identifier of the second cell; receiving, at the computing device, the cell global identifier of second cell from the user device; and modifying, by the computing device, the relationship table to include a new handover relationship between the first cell and the second cell using the cell global identifier of the second cell; and employing, by the computing device, the handover of the communications for the user device from the first cell to the second cell.

Determining if the known handover relationship between first cell and the second cell is stored in the relationship table may comprise: comparing, by the computing device, a physical cell identifier received from the user device to entries in the relationship table to determine whether the relationship table includes an entry for the known handover relationship between the first cell and the second cell.

Determining if the known handover relationship between first cell and the second cell is stored in the relationship table may comprise: determining, by the computing device, whether a signal strength between the second cell and the user device exceeds a threshold value; and in response to the signal strength exceeding the threshold value, querying, by the computing device, the relationship table for the known handover relationship.

Modifying the relationship table may comprise: generating, by the computing device an entry in the relationship table of the first cell to include a mapping between the cell global identifier of the second cell and the first cell.

The method may include: receiving, at the user device, a physical cell identifier from the second cell; sending, by the user device, the request to handover the communications from the first cell to the second cell, wherein the request includes the physical cell identifier; receiving, at the user device, an instruction from the computing device to obtain the cell global identifier of the second cell; obtaining, by the user device, the cell global identifier of the second cell from second cell; and reporting, by the user device, the cell global identifier of second cell to the computing device.

The method may include: requesting, by the user device, handover of the communications from the first cell to the second cell in response to receipt of an indication of the second cell; obtaining, by the user device, the cell global identifier of the second cell in response to receipt of an instruction from the computing device to obtain the cell global identifier of the second cell; and reporting, by the user device, the cell global identifier of second cell to the computing device.

The method may include: receiving, at the user device, a physical cell identifier and a signal strength associated with the second cell; reporting, by the user device, the physical cell identifier and the signal strength to the computing device to request the handover from the first cell to the second cell; obtaining, by the user device, the cell global identifier of the second cell in response to receipt of an instruction from the computing device to obtain the cell global identifier of the second cell; and reporting, by the user device, the cell global identifier of second cell to the computing device to complete the handover from the first cell to the second cell.

A computing device may be summarized as comprising: a memory that stores computer instructions and a processor. The processor, when executing the computer instructions, causes the computing device to: receive a report from a user device that is utilizing a first cell for communications, the report includes a physical cell identifier of a second cell; query a relationship table of the first cell for a known handover relationship between the first cell and the second cell using the physical cell identifier. In response to a lack of the known handover relationship between the first cell and the second cell in the relationship table of the first cell, the processor, when executing the computer instructions, causes the computing device to: transmit a request to the user device to obtain a cell global identifier of the second cell; receive the cell global identifier of second cell from the user device; and modify the relationship table of the first cell to include a new handover relationship between the first cell and the second cell using the cell global identifier and the physical cell identifier.

The processor, when executing the computer instructions to query the relationship table of the first cell, may further cause the computing device to: compare the physical cell identifier to entries in the relationship table to determine whether the relationship table includes an entry for the known handover relationship between the first cell and the second cell.

The processor, when executing the computer instructions to modify the relationship table of the first cell to include a new handover relationship between the first cell and the second cell, may further cause the computing device to: generate an entry in the relationship table of the first cell, wherein the entry includes a mapping between a physical cell identifier of the second cell and the cell global identifier of the second cell.

The processor, when executing the computer instructions to query the relationship table of the first cell, may further cause the computing device to: determine whether a signal strength included in the report exceeds a threshold value; and in response to the signal strength exceeding the threshold value, query the relationship table for the known handover relationship.

The processor, when executing the computer instructions, may further cause the computing device to: handover the communications for the user device from the first cell to the second cell.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a computing device, comprising:
  a first memory that stores first computer instructions; and
  a first processor configured to execute the first computer instructions to:
    receive a request to handover wireless communications for a user device from a first cell in a network to a second cell in the network, wherein the request includes a signal strength associated with the second cell;
    determine whether the signal strength exceeds a threshold value;
    in response to the signal strength exceeding the threshold value, query a relationship table of the first cell for a known handover relationship between the first cell and the second cell;
    in response to a lack of the known handover relationship between the first cell and the second cell in the relationship table of the first cell:
      instruct the user device to obtain a cell global identifier of the second cell;
      receive the cell global identifier of second cell from the user device; and
      add a new handover relationship between the first cell and the second cell to the relationship table using the cell global identifier of the second cell; and
    handover the communications for the user device from the first cell to the second cell.

2. The system of claim 1, wherein the request includes a physical cell identifier of the second cell and wherein the first processor is configured to query the relationship table of the first cell by further executing the first computer instructions to:
compare the physical cell identifier to entries in the relationship table to determine whether the relationship table includes an entry for the known handover relationship between the first cell and the second cell.

3. The system of claim 1, wherein the first processor is configured to add the new handover relationship between the first cell and the second cell to the relationship table by further executing the first computer instructions to:
generate an entry in the relationship table of the first cell, wherein the entry includes a mapping between a physical cell identifier of the second cell and the cell global identifier of the second cell.

4. The system of claim 1, wherein the computing device is the first cell.

5. The system of claim 1, further comprising:
the user device, which comprises:
  a second memory that stores second computer instructions; and
  a second processor configured to execute the second computer instructions to:
    initiate the communications with another computing device using the first cell;
    receive a physical cell identifier from the second cell;
    send the request to handover the communications from the first cell to the second cell, wherein the request includes the physical cell identifier;
    receive an instruction from the computing device to obtain the cell global identifier of the second cell;
    obtain the cell global identifier of the second cell from second cell; and
    report the cell global identifier of second cell to the computing device.

6. The system of claim 1, further comprising:
the user device, which comprises:
  a second memory that stores second computer instructions; and a second processor configured to execute the second computer instructions to:
request handover of the communications from the first cell to the second cell in response to receipt of an indication of the second cell;
obtain the cell global identifier of the second cell in response to receipt of an instruction from the computing device to obtain the cell global identifier of the second cell; and
report the cell global identifier of second cell to the computing device.

7. The system of claim 1, further comprising:
the user device, which comprises:
a second memory that stores second computer instructions; and
a second processor configured to execute the second computer instructions to:
receive a physical cell identifier and a signal strength associated with the second cell;
report the physical cell identifier and the signal strength to the computing device to request the handover from the first cell to the second cell;
obtain the cell global identifier of the second cell in response to receipt of an instruction from the computing device to obtain the cell global identifier of the second cell; and
report the cell global identifier of second cell to the computing device to complete the handover from the first cell to the second cell.

8. A method, comprising:
receiving, at a computing device, a request to handover wireless communications for a user device from a first cell in a network to a second cell in the network;
determining, by the computing device, whether a signal strength between the second cell and the user device exceeds a threshold value;
in response to the signal strength exceeding the threshold value, determining, by the computing device, if a known handover relationship between the first cell and the second cell is stored in a relationship table of the first cell;
in response to determining that the known handover relationship between the first cell and the second cell is not stored in the relationship table of the first cell:
instructing, by the computing device, the user device to obtain a cell global identifier of the second cell;
receiving, at the computing device, the cell global identifier of second cell from the user device; and
modifying, by the computing device, the relationship table to include a new handover relationship between the first cell and the second cell using the cell global identifier of the second cell; and
employing, by the computing device, the handover of the communications for the user device from the first cell to the second cell.

9. The method of claim 8, wherein determining if the known handover relationship between first cell and the second cell is stored in the relationship table comprises:
comparing, by the computing device, a physical cell identifier received from the user device to entries in the relationship table to determine whether the relationship table includes an entry for the known handover relationship between the first cell and the second cell.

10. The method of claim 8, wherein modifying the relationship table comprises:

generating, by the computing device an entry in the relationship table of the first cell to include a mapping between the cell global identifier of the second cell and the first cell.

11. The method of claim 8, further comprising:
receiving, at the user device, a physical cell identifier from the second cell;
sending, by the user device, the request to handover the communications from the first cell to the second cell, wherein the request includes the physical cell identifier;
receiving, at the user device, an instruction from the computing device to obtain the cell global identifier of the second cell;
obtaining, by the user device, the cell global identifier of the second cell from second cell; and
reporting, by the user device, the cell global identifier of second cell to the computing device.

12. The method of claim 8, further comprising:
requesting, by the user device, handover of the communications from the first cell to the second cell in response to receipt of an indication of the second cell;
obtaining, by the user device, the cell global identifier of the second cell in response to receipt of an instruction from the computing device to obtain the cell global identifier of the second cell; and
reporting, by the user device, the cell global identifier of second cell to the computing device.

13. The method of claim 8, further comprising:
receiving, at the user device, a physical cell identifier and a signal strength associated with the second cell;
reporting, by the user device, the physical cell identifier and the signal strength to the computing device to request the handover from the first cell to the second cell;
obtaining, by the user device, the cell global identifier of the second cell in response to receipt of an instruction from the computing device to obtain the cell global identifier of the second cell; and
reporting, by the user device, the cell global identifier of second cell to the computing device to complete the handover from the first cell to the second cell.

14. A computing device, comprising:
a memory that stores computer instructions; and
a processor that, when executing the computer instructions, causes the computing device to:
receive a report from a user device that is utilizing a first cell for communications, the report includes a physical cell identifier of a second cell;
determine whether a signal strength included in the report exceeds a threshold value;
in response to the signal strength exceeding the threshold value, query a relationship table of the first cell for a known handover relationship between the first cell and the second cell using the physical cell identifier; and
in response to a lack of the known handover relationship between the first cell and the second cell in the relationship table of the first cell:
transmit a request to the user device to obtain a cell global identifier of the second cell;
receive the cell global identifier of second cell from the user device; and
modify the relationship table of the first cell to include a new handover relationship between the first cell and the second cell using the cell global identifier and the physical cell identifier.

15. The computing device of claim 14, wherein the processor, when executing the computer instructions to query the relationship table of the first cell, further causes the computing device to:
  compare the physical cell identifier to entries in the relationship table to determine whether the relationship table includes an entry for the known handover relationship between the first cell and the second cell.

16. The computing device of claim 14, wherein the processor, when executing the computer instructions to modify the relationship table of the first cell to include a new handover relationship between the first cell and the second cell, further causes the computing device to:
  generate an entry in the relationship table of the first cell, wherein the entry includes a mapping between a physical cell identifier of the second cell and the cell global identifier of the second cell.

17. The computing device of claim 14, wherein the processor, when executing the computer instructions, further causes the computing device to:
  handover the communications for the user device from the first cell to the second cell.

\* \* \* \* \*